United States Patent [19]

Thomas, Jr.

[11] 3,731,097

[45] May 1, 1973

[54] METHOD AND APPARATUS FOR ELIMINATING SPOT DOUBLING IN PRECESSION X-RAY CRYSTALLOGRAPHY

[75] Inventor: Roy Leander Thomas, Jr., Medway, Mass.

[73] Assignee: Charles Supper Company, Natick, Mass.

[22] Filed: Oct. 7, 1971

[21] Appl. No.: 187,353

[52] U.S. Cl. ................................................ 250/51.5
[51] Int. Cl. ............................................. G01n 23/20
[58] Field of Search .............................. 250/51.5

[56] References Cited

OTHER PUBLICATIONS

"Elimination of Spot Doubling in Precession Photography . . . ," J. R. Einstein, Journal of Appl. Crystallography 1970, pp. 180, 181 (9/8/69).

Primary Examiner—James W. Lawrence
Assistant Examiner—C. E. Church
Attorney—John H. Coult

[57] ABSTRACT

A film cassette for a precession-type crystallographic camera includes a mask adjacent the film plane of the camera which is rotated in synchronism with the camera's precession motion to block a selected one of the two X-ray beam reflections produced for each reciprocal lattice point during a precessive cycle of the camera. A novel method of precession photography is disclosed.

5 Claims, 7 Drawing Figures

Patented May 1, 1973  3,731,097
2 Sheets-Sheet 1
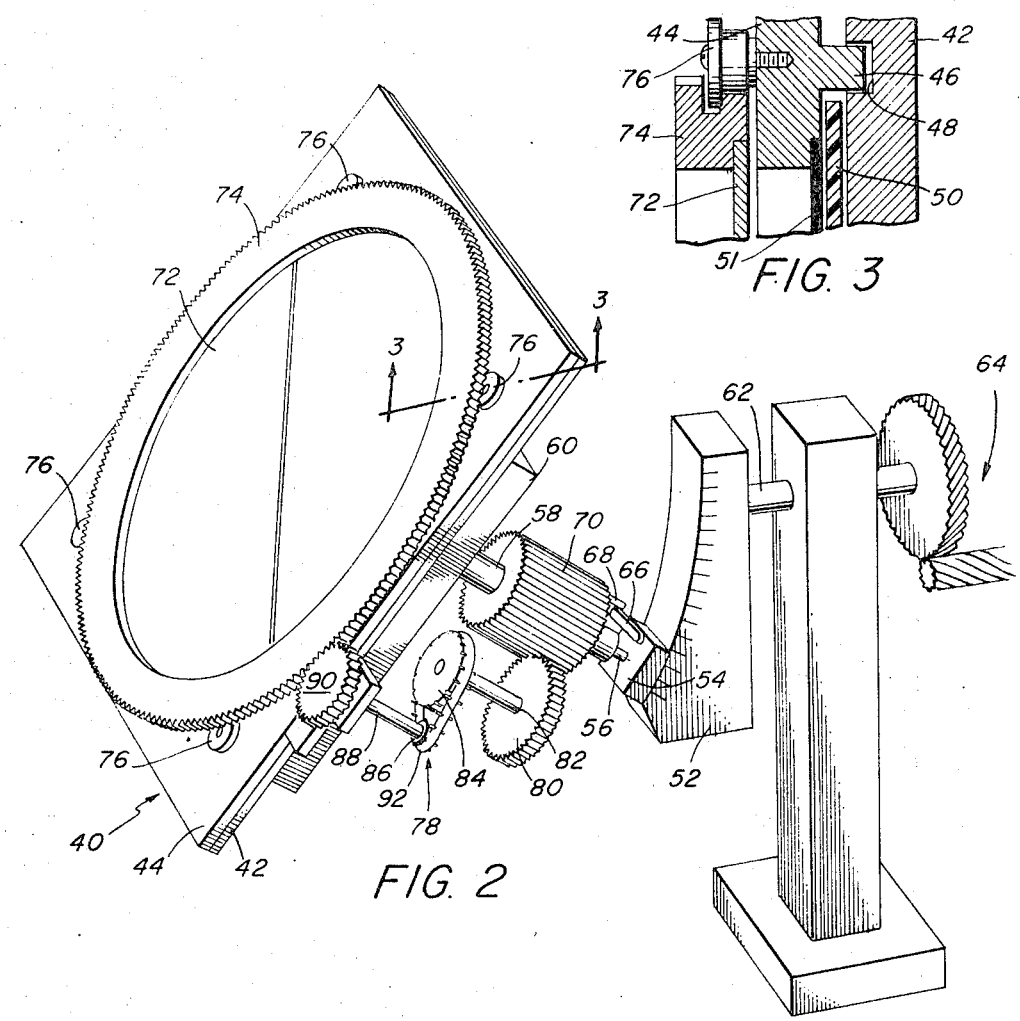
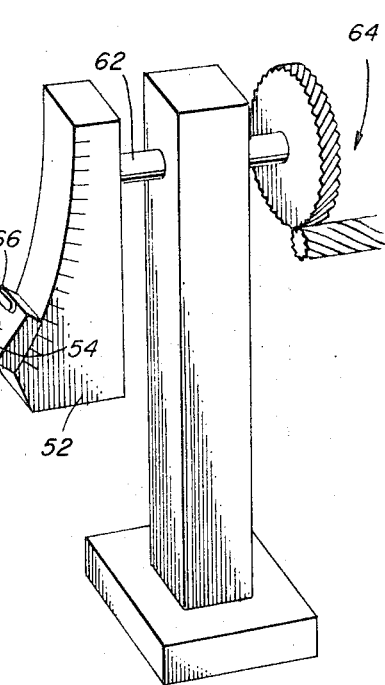
FIG. 3
FIG. 2
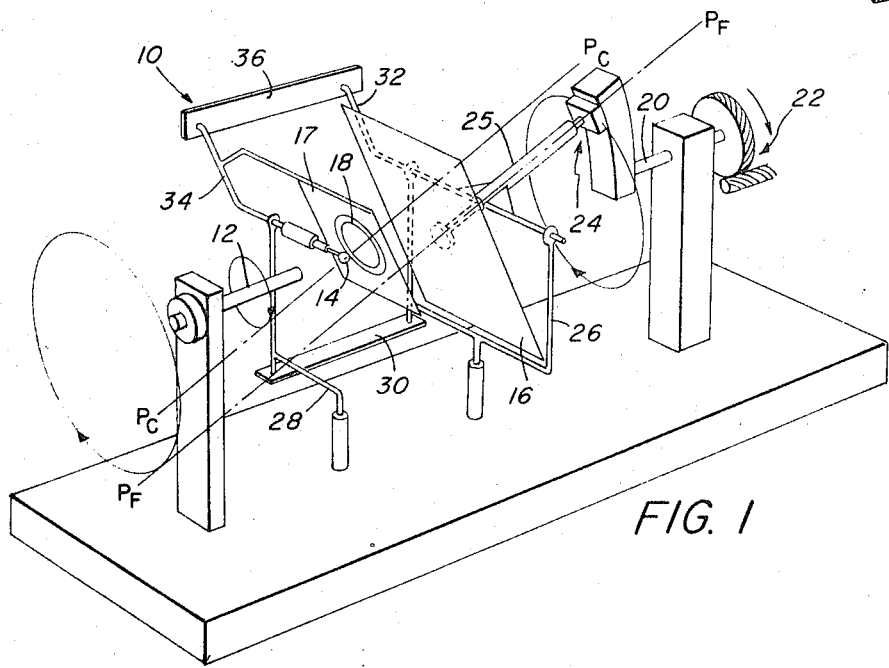
FIG. 1

METHOD AND APPARATUS FOR ELIMINATING SPOT DOUBLING IN PRECESSION X-RAY CRYSTALLOGRAPHY

BACKGROUND OF THE INVENTION

A characteristic of precession cameras, relative to other types of X-ray crystallographic cameras, is that each of the spots representing the recorded reciprocal lattice comprises a superposition of two beam reflections which converge and intersect at the recording film. One beam reflection is generated as a reciprocal lattice point enters the sphere of reflection during precession of the reciprocal lattice plane normal, the other as it emerges. However, the achievement in practice of exact coincidence of the beam reflections is difficult and time consuming. Failure to achieve coincidence results in the recording of an elongated spot, or two separate and distinct spots if the beam reflections do not overlap on the recording film.

The problem of spot doubling in precession photography is discussed by T. Zoltai in The American Minerologist, Vol. 48, pp. 759–771; and by J. R. Einstein in the Journal of Applied Crystallography, Vol. 3 (1970), pp. 180–181. As pointed out in these publications, the chief cause of spot doubling is non-parallelism of the recorded reciprocal lattice plane with the recording material, and incorrect film-to-crystal distance.

Zoltai suggests in the noted publication that one of the two beam reflections can be blocked by the use of a specially constructed layer-line screen having an 180° arcuate slit, rather than the conventional 360° slit, which is rotated in synchronism with the precession motion of the camera. In the Zoltai device, synchronization of the layer-line screen position with the camera's precession motion is accomplished by mechanically linking the rotatable screen to a stationary portion of the camera. A pin attached to the beam trap is inserted into one of a series of stops drilled into his special layer-line screen assembly.

The Zoltai device has two fundamental drawbacks. First, a complete set of specially constructed layer-line screens is required. Second, the mechanical linkage necessary to connect the beam stop and layer-line screen casts a shadow on the recording film and thus obscures a portion of the reciprocal lattice which is being recorded. Einstein proposes in the referenced publication to overcome the latter problem by rotating a layer-line screen at uniform rate by coupling it to the main drive shaft of the associated camers's precession mechanism. This arrangement nevertheless necessitates the use of a special layer-line screen assembly and set of special screens, with the attendant inconvenience and cost thereof.

Prior to this invention no significant improvement has been made on the Zoltai masking technique as modified by Einstein. The described deficiencies in the prior art are surmounted according to this invention by the provision of a film cassette having a partially open (preferably semi-circular) mask which is rotated in synchronism with the precession motion of the associated camera so as to block one-half of the rolling Laue cone at the film plane and thus remove one of the two focused reflections for each lattice point which are generated during each precessive cycle of the camera.

An obstacle to reaching this discovery was the expected severity of the lattice recording errors which would be introduced by this novel approach; however, as described in detail below, it has been verified that the errors introduced are not so significant as to detract from the usefulness of devices constructed according the principles of this invention.

OBJECTS OF THE INVENTION

It is an object of this invention to provide improved methods and apparatus for eliminating double spots in X-ray crystallographic records made by the precession technique.

It is another object of this invention to provide double spot eliminating apparatus for use in precession-type cameras which does not cast shadows on the reciprocal lattice being recorded.

It is still another object to provide double spot eliminating apparatus which does not require the use of a set of specially constructed layer-line screen structures, which permits the associated diffraction camera to be rapidly and conveniently switched between normal and masking modes of operation, and which is equally applicable to zero or upper level photography as well as to techniques of crystallography wherein a layer-line screen is not employed.

It is yet another object to provide improved methods and apparatus for practicing multiple film precession crystallography by which double spots on all films are eliminated.

It is a further object of this invention to provide double spot eliminating apparatus in which the phasing of a masking member relative to the coordinated precession cycle may be easily varied to enable, inter alia, the rejection of the unwanted one of the two beam reflections.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

FIG. 1 is a highly schematic representation of a conventional precession type X-ray diffraction camera of a type widely used and commercially available;

FIG. 2 is a fragmentary perspective view of an improved film cassette assembly which is useful in a camera of the type shown in FIG. 1 and which embodies this invention; elements of the cassette assembly and associated camera structures not necessary to an understanding of this invention have been omitted;

FIG. 3 is a fragmentary sectional view taken along lines 3—3 in FIG. 2;

FIG. 4 represents a zero level camera setting; FIG. 5 an upper level camera setting.

DESCRIPTION OF THE PREFERRED EMBODIMENTS

Figure 6:
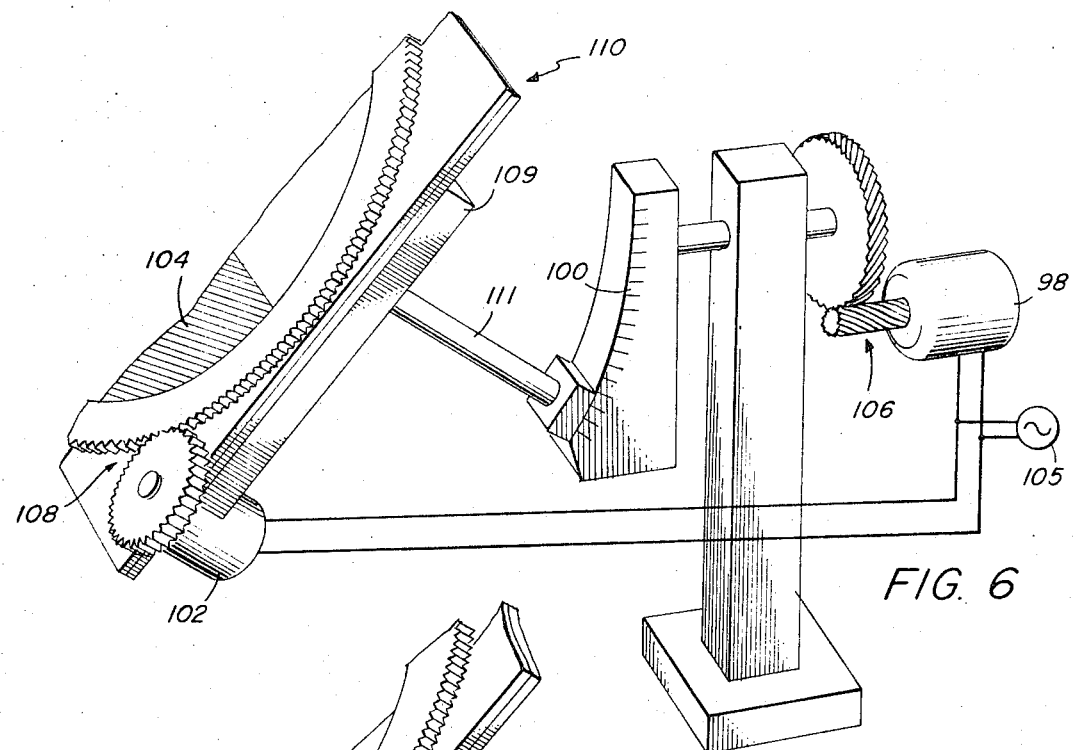
FIGS. 6 and 7 show alternative mask drive structures which may be employed to implement the teachings of this invention.

In order that the invention and its merits may be most fully appreciated, the general construction and operation of a conventional precession-type X-ray diffraction camera will be explained.

FIG. 1 shows very schematically a precession X-ray camera 10 including a collimator 12 for collimating a beam of X-rays from an X-ray generator (not shown). A crystal specimen 14 is supported in the X-ray beam. The crystal specimen 14 will diffract the X-ray beam producing a diffraction pattern uniquely characterizing the lattice structure of the crystal specimen which is recorded on recording materials 16 located behind the specimen 14.

The diffraction pattern is composed of one or more X-ray beams which are reflected off the lattice planes of the crystal at an angle with respect to the beam axis which is an inverse function of the spacing of the crystal lattice planes and at an azimuth which corresponds to azimuth of the diffracting lattice planes. The location and strength of the reflected X-ray beams is stored on the recording materials 16. A layer-line screen 17, representing one of a set of screens, having a circular slot 18 therein scans the diffraction pattern and permits selection of only those reflected beams having a prescribed diffraction order.

In order that a specimen 14 may be fully examined, the specimen 14 is caused to precess in the X-ray beam. The precession axis of the crystal is designated $P_c$—$P_c$ in FIG. 1. The recording materials 16 are likewise given a precessive movement which corresponds to and is synchronized with the precessive movement of the specimen. The axis of precession of the recording materials 16 is designated $P_f$—$P_f$ in FIG. 1. As is well known, a precessive movement can be imparted to the recording materials 16 by means of an eccentric arm or arc 19 rotated by an electric motor (not shown) through a shaft 20 and worm gear transmission 22. A bearing assembly 24 holds, but permits rotation of, the end of a column 25 supporting the recording materials 16. The eccentricity of bearing assembly 24 on the arc 19 is adjustable to permit variation of the angle of tee cone of revolution (the precession angle) developed by the precession axis $P_f$—$P_f$ during rotation thereof.

The precessive movement of the specimen 14 and recording materials 16 are conventionally synchronized and caused to correspond by coupling the specimen 14 to recording materials 16. This coupling is conventionally accomplished by the use of an articulated linkage developing in the specimen 14 sinusoidal motions in two orthogonal planes to closely simulate the true precession motion of the recording materials 16. The linkage is shown as taking the form of a yoke 26, a yoke 28, and a coupling bar 30 which develop horizontal sinusoidal components of motion in the specimen 14. L-bars 32 and 34 coupling bar 36 develop vertical sinusoidal components of motion in the specimen 14. For a full explanation of precession cameras, their structures and methods of operation, reference may be had to the text "The Precession Method" by Martin J. Burger, John Wiley & Sons, Inc., N. Y. (1964).

During each cycle of a precession camera, a pair of beams are reflected, 180° displaced in the cycle, to a predetermined reciprocal lattice point location on the recording materials. As described in detail in the above-referenced publications of Zoltai and Einstein, the beams, for any of a number of reasons, may not coincide at the recording materials, resulting in the recording of an elongated spot, or a pair of completely separated spots. For purposes of this application, in the interests of simplicity, the terms "double spot" or "spot doubling" are intended to encompass the spot elongation condition wherein some degree of overlap is present, as well as the more extreme condition wherein the spots are distinct and completely separate. Further, as used herein "beam reflection" is intended to mean the mark or image made by an X-ray beam which is reflected, or more accurately, diffracted, by an irradiated crystal specimen.

As suggested above, the Zoltai and Einstein publications suggest partial solutions to this spot doubling problem in precession photography. By this invention there is provided improved method and apparatus for overcoming the spot doubling problem which involves the use of a novel film cassette assembly. FIGS. 2 and 3 illustrate a film cassette 40 representing a preferred embodiment of the principles of this invention. FIG. 2 depicts the film cassette assembly 40 and associated drive system, but all other structure not directly relevant to a description of the cassette has been removed to clarify illustration of the invention. The film cassette assembly 40 is shown as including film holding means in the form of a back plate 42 and a front plate 44 which mate to form a light-tight enclosure for receiving and supporting one or more sheets of X-ray sensitive film 50. The front plate has a lip 46 which is received in a groove 48 in the back plate 42 to provide a light seal for the cassette assembly 40. A dark slide 51 covers an exposure opening 54 in the front plate 44 until such time as it is desired to expose the film 50.

Means for effecting a precession movement of the cassette assembly 40 are illustrated as comprising an eccentric arm or arc 52 on which is mounted a bearing assembly 54 selectively adjustable on the arc 52. The bearing assembly 54 supports for rotation the end 56 of a shaft 58 rotatably supported by a cassette holder 60. The cassette assembly 40 and cassette holder 60 may be provided with means (not shown but well known) for enabling the cassette assembly 40 to be removed from the holder 60 to facilitate film handling.

The arc 52 is mounted on a drive shaft 62 rotated by an electric motor, for example, (not shown) through a worm gear transmission 64. Bearing assembly 54 carries a finger 66 which engages a lug 68 extending axially from a gear 70 affixed to the shaft 58 so as to cause the gear (and shaft 58) to rotate in synchronism with the arc 52. It can be seen from an inspection of the FIG. 1 schematic diagram and FIGS. 2–3, that the gear 70, thus driven, rotates relative to the cassette holder 60 but is motionless with respect to the arc 52.

It is a stated object of this invention to provide for use in a precession-type X-ray diffraction camera improved apparatus for eliminating the discussed spot doubling (including spot elongation) phenomena. To this end, there is provided synchronous masking means for blocking a selected one of the two reflected X-ray beams for each reciprocal lattice point produced during each precessive cycle of a precession camera. In the illustrated FIGS. 2–3 embodiment the masking means is illustrated as taking the form of a semi-circular mask 72. The mask 72 is mounted on a ring gear 74 supported for rotation by a number of flanged ball bearings 76 spaced around the periphery of the ring gear 74.

A number of structures are contemplated for rotating the ring gear 74, and thus the mask 72, in synchronism with the precessive cycle of the associated camera. In the illustrated preferred embodiment, a gear train 78 mounted on the cassette holder 60 transmits the relative rotation of the gear 70 on shaft 58 to the ring gear 74 at a 1:1 transfer ratio. The gear train 78 is shown as comprising a spur gear 80 which is driven by the gear 70 and which in turn imparts its rotation through a shaft 82 to a sprocket 84. A smaller sprocket 86 carried on a common shaft 88 with a pinion 90 is driven from sprocket 84 by a timing-type belt 92. The pinion 90 engages and drives the ring gear 74.

The elements of the gear train 78 are chosen such that step-up in angular velocity from the gear 70 to pinion 90 equals the step-down in angular velocity from the pinion 90 to the ring gear 74, whereby synchronism of the mask 72 with the arc 52 is achieved.

The phase of the mask 72 relative to the phase of the camera's precessive cycle, as determined by the rotation of the arc 52, may be selectively varied by disengaging, wholly or partially, the cassette assembly 40 from the cassette holder 60 so as to release ring gear 74 from the pinion 90. The ring gear 74 may then be freely rotated to any desired azimuthal position before it is again engaged with pinion 90.

In devices constructed according to this invention, the mask 72 is rotated at uniform velocity; however, the gimbal supports employed in most precession instruments, typified by the FIG. 1 camera, do not produce a uniform precession motion. The position of the rolling axis of the reciprocal lattice plane differs in phase from that which would be given by a constant angular velocity. The maximum phase difference occurs at the 45° orientation of the rolling axis; the phase difference is zero for horizontal and vertical orientations of the rolling axis.

Figure 4:
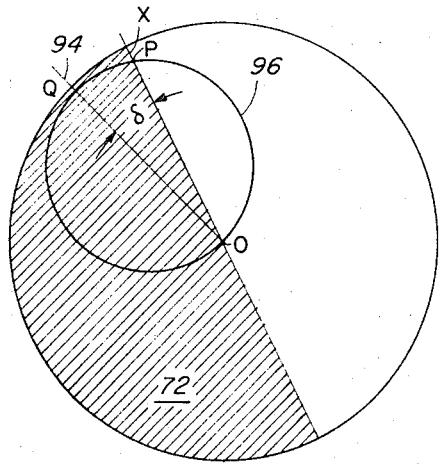
FIGS. 4 and 5 are diagrams illustrating the phase relationship between a rotating mask of this invention and the Laue cone of an irradiated crystal specimen during a precessive cycle of the FIGS. 2–3 embodiment.

FIG. 4 shows (exaggerated) the position of the mask 72 as it might appear relative to the position of the rolling axis 94 of the Laue cone in the zero level of the reciprocal lattice. The circle of intersection of the Laue cone with the sphere of reflection is outlined at 96. If the mask 72 differs in phase by an angle $\delta$ relative to the position of the rolling axis 94, beam reflections within a radial distance $x$ of the perimeter of the reciprocal lattice are incorrectly masked. On the zero level $OQ = 2 \sin \bar{\mu}$, where $\bar{\mu}$ is the angle between the X-ray beam and the rotational direction of the crystal under consideration (ordinarily a crystallographic axis), commonly termed the precession angle, and $$x = 2 \sin \bar{\mu} - 2 \sin \bar{\mu} \cos \delta = 4 \sin \bar{\mu} \sin^2 \delta/2 \quad (1)$$

Figure 5:
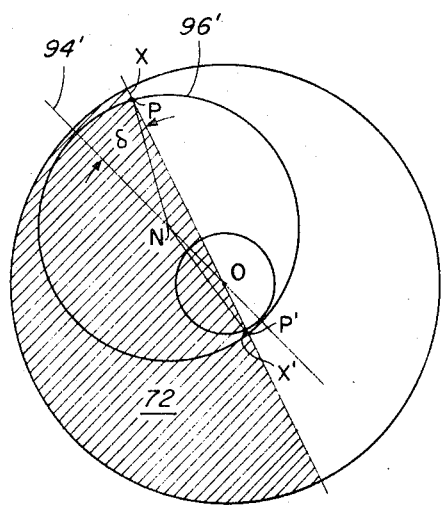

FIG. 5 represents the position of the mask 72 relative to the rolling axis 94' of a Laue cone outline 96' during photography of upper levels of the reciprocal lattice. As shown in FIG. 5, portions of the reciprocal lattice a radial distance $x$ beyond $OP$ are incorrectly masked. Similarly, portions of the reciprocal lattice a distance $x'$ beyond the interior blind spot of the record are also affected. In triangle $ONP$, $ON = \sin \bar{\mu}$, $NP = \sin \bar{\nu}$, $OP = (\sin \bar{\nu} + \sin \bar{\mu} - x)$, and angle $PON = \delta$, where $\bar{\nu}$ is the half-opening angle of the Laue cone. Application of the law of cosines leads to a quadratic equation in $x$, from which $$x = \sin - \bar{\nu} + 2 \sin \bar{\mu} \sin^2(\delta/2) \pm [\sin^2 \bar{\nu} + 4 \sin^2 \bar{\mu} \sin^2(\delta/2)(\sin^2(\delta/2) - \bar{\nu})]^{1/2} = \sin - \bar{\nu} + 2 \sin \bar{\mu} \sin^2(\delta/2) \pm [\sin^2 \bar{\nu} - \sin^2 \bar{\mu} \sin^2 \delta]^{1/2} \quad (2)$$

The solution with negative sign reduces to (1) for zero-level geometry (i.e., when $\bar{\nu} = \bar{\mu}$) and may be selected as tee correct expression. Similarly, in triangle $ONP'$, $ON = \sin \bar{\mu}$, $NP' = \sin \bar{\nu}$, $OP' = (\sin \bar{\nu} - \sin \bar{\mu} + x')$, and angle $NOP' = \pi - \delta$, from which $$x' = \sin - \bar{\nu} + 2 \sin \bar{\mu} \sin^2(\delta/2) \pm [\sin^2 \bar{\nu} + 4 \sin^2 \bar{\mu} \sin^2(\delta/2)(\sin^2(\delta/2) - 1)]^{1/2} = \sin - \bar{\nu} + 2 \sin \bar{\mu} \sin^2(\delta/2) \pm [\sin^2 \bar{\nu} - \sin^2 \bar{\mu} \sin^2 \delta]^{1/2} \quad (3)$$

The solution with positive sign reduces to zero when $\bar{\nu} = \bar{\mu}$ and represents the correct expression.

J. Waser, in Review of Scientific Instruments, Vol. 22, pp. 563–566, (1951) has shown that the maximum value of $\delta$ at the 45° orientation of the rolling axis increases with increasing $\bar{\mu}$. The phase difference is small, however. At $\bar{\mu} = 30°$, assumed to be the upper limit for precession angles employed in practice, $\delta$ is approximately 4°. According to relation (1). this affects only reflections within $x = 0.0024$ reciprocal lattice units of the edge of the zero level (0.15 millimeter on a film recorded with a 60 millimeter crystal-to-film distance). Structural limitations in available precession cameras cause the uppermost level accessible to have a spacing of approximately 0.35 rlu at $\bar{\mu} = 30°$. From relations (2) and (3), for the maximum value of $\delta = 4°$, $x = 0.0019$ rlu (0.12 millimeter) and $x' = 0.00051$ rlu (0.03 millimeter). It is manifest therefore that, even at extreme instrument settings, a negligible portion of a precession film is affected by the approximate phasing of the mask 72. In even the worst circumstance, the incorrectly masked reflections fall within the peripheral band of background shadow transmitted through the extremes of the layer-line screen aperture. Reflections within these bands are of limited usefulness even in normal precession photographs.

Figure 7:
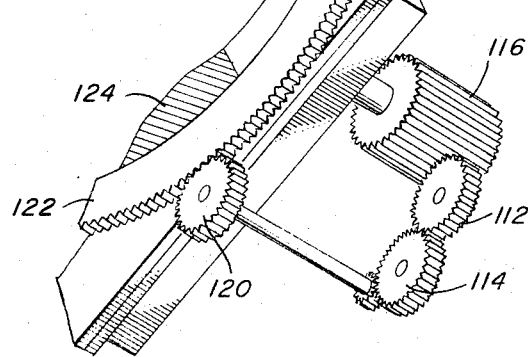

FIGS. 6 and 7 show alternative embodiments of mask drive structures which may be employed to implement this invention. In the FIG. 6 embodiment a synchronous motor 98 for driving arc 100 and a synchronous motor 102 for driving mask 104 are powered from a common source 105 of AC electrical energy such that the motors 98, 102 rotate in exact synchronism. A worm gear transmission 106 and a pinion-and-ring gear transmission 108 are selected to provide a 1:1 transmission drive ratio. The synchronous motor 102 may be supported on a cassette holder 109 for supporting film cassette 110. Shaft 111 is affixed to the arc 100.

FIG. 7 shows another mask drive embodiment similar to the FIGS. 2 and 3 embodiment, but having a pair of idler gears 112, 114 between main bear 116 and a spur gear 118 on a common shaft with a pinion 120 driving a ring gear 122 which carries a mask 124. As in the FIGS. 2–3 and 6 embodiments, the components of the FIG. 7 gear train are selected to give a 1:1 transmission ratio.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. For use in an X-ray diffraction camera of the precession type, a film cassette comprising:

film holding means for receiving and supporting X-ray sensitive recording materials in light-tight relationship; and masking means for blocking a selected one of two reflected X-ray beams for each reciprocal lattice point produced during a precessive cycle of the camera, comprising:

a mask, mask mounting means attached to said film holding means for supporting said mask for rotation adjacent and in front of said recording materials, and transmission means adapted to be driven from a source of power for rotating said mask in synchronism with the precession movement of the camera such that said mask effects said selective blocking of one of said reflected beams.

2. The apparatus defined by claim 1 wherein said mask is semi-circular in shape.

3. The apparatus defined by claim 1 including means for adjusting the phase of said mask relative to the phrase of said precessive cycle.

4. In an X-ray diffraction camera of the precession type, the combination comprising:

specimen-holding means for supporting a specimen for irradiation by a beam of X-rays having a primary beam axis;

film-holding means for supporting X-ray sensitive recording materials in a recording plane of said beam axis for recording a reciprocal lattice of said specimen;

precession means for effecting a coordinated precession movement of said specimen-holding means and said film-holding means with respect to said beam axis; and synchronous mask means for blocking a selected one of two X-ray reflected beams for each reciprocal lattice point produced during a precessive cycle of said precession means, comprising:

a semi-circular mask, mask mounting means for supporting said mask for rotation adjacent and in front of said recording materials and about said beam axis, and drive means for rotating said mask in synchronism with said precession movement of said specimen-holding means and said film holding means, such that said mask effects said selective blocking of one of said reflected beams.

5. A method of precession-type X-ray diffraction photography, comprising:

generating a beam of X-rays;

supporting a specimen in said beam;

locating behind said specimen a recording film for recording X-rays diffracted by said specimen;

causing said specimen and said recording film to precess in coordination with respect to said beams to produce during a complete precessive cycle two reflected X-ray beams for each reciprocal lattice point; and rotating a semi-circular mask in front of and immediately adjacent said recording film in synchronism and in predetermined phase relationship with the precessive movement of said specimen and said recording film so as to pass to said recording film one of said deflected X-ray beams while excluding the other of said reflected beams.

* * * * *